Sept. 2, 1924.
G. E. EVEY
1,507,051
SLED RUNNER HAYRAKE
Filed Dec. 29, 1921
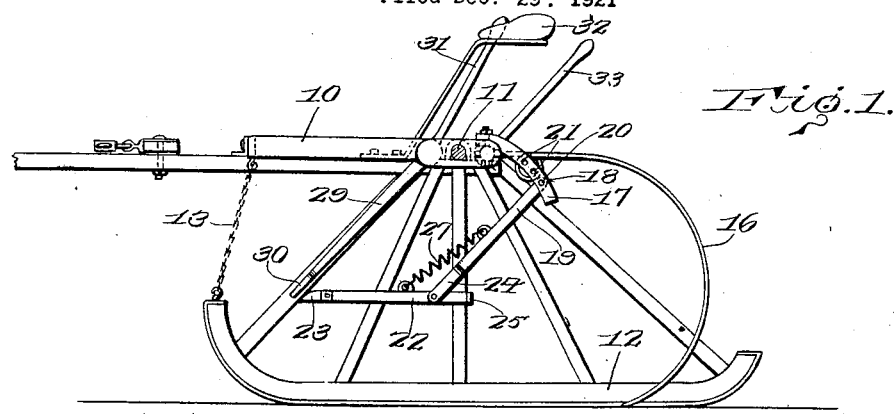
Fig. 1.
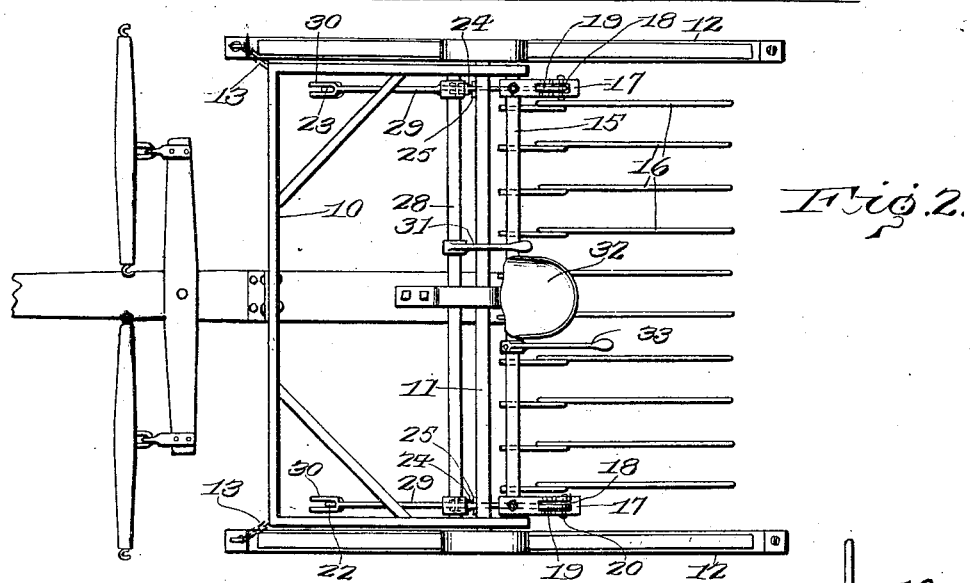
Fig. 2.
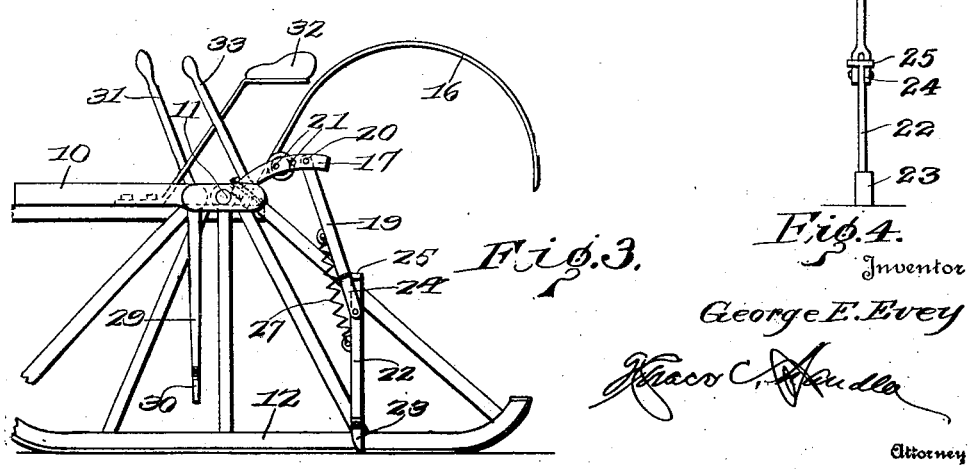
Fig. 3.
Fig. 4.
Inventor
George E. Evey
Attorney Patented Sept. 2, 1924.

1,507,051

UNITED STATES PATENT OFFICE.

GEORGE E. EVEY, OF LISCO, NEBRASKA.

SLED-RUNNER HAYRAKE.

Application filed December 29, 1921. Serial No. 525,615.

*To all whom it may concern:*

Be it known that I, GEORGE E. EVEY, a citizen of the United States, residing at Lisco, in the county of Garden, State of Nebraska, have invented certain new and useful Improvements in Sled-Runner Hayrakes; and I do hereby declare the following to be a full, clear, and exact description of the invention, such as will enable others skilled in the art to which it appertains to make and use the same.

This invention relates to new and useful improvements in rakes and more particularly to horse hay rakes.

One object of the invention is to provide sled runners for a horse hay rake whereby the device will run smoothly over bumps, bogs, and ditches, and will not jerk or jump, or scatter the hay as wheels generally do.

Another object of the invention is to provide a rake of this character wherein the mechanism is provided for automatically dumping the load.

A further object of the invention is to provide a novel mechanism arranged to be depressed into engagement with the ground whereby the rake tooth shaft will be rocked to raise the teeth and discharge the load.

Other objects and advantages will be apparent from the following description when taken in connection with the drawings.

In the drawings:

Figure 1 is a side elevation of a hay rake made in accordance with the invention.

Figure 2 is a top plan view.

Figure 3 is a side elevation showing the device in dumping position.

Figure 4 is a rear elevation of one of the arms 22, and a portion of the arm 19.

Referring particularly to the accompanying drawings 10 represents a horizontal angular U-shaped frame in the rear ends of the arms of which is supported a transverse axle 11, the ends of said axle having the sled runners 12, pivotally supported thereon. The forward ends of the runners are connected to the front portion of the frame 10 by flexible elements such as the chains 13. Extending transversely of the rear of the frame 10, and supported in the rear ends thereof, is a rock-shaft 15, to which are secured a series of spring rake teeth 16. Rigidly secured to each end of this shaft 15, and extending rearwardly and downwardly therefrom, is a plate 17, and in this plate is formed an opening 18. Disposed in this opening is one end of an arm 19, the same being connected with the plate 17 by means of a transverse pivot pin 20.

A series of openings 21 are formed in the plate 17 so that the arm 19 may be adjusted longitudinally of the opening 18. Pivotedly connected to the outer ends of each of the arms 19, is an arm 22, the forward end of which is preferably pointed and provided with a protecting metal shoe 23. The arm 22 is disposed within a bifurcation 24 in the arm 19, and formed on the end of the first mentioned arm, rearwardly of the pivotal mounting thereof, is a transverse T head 25, which is arranged to bear against the rear edges of the furcations of the arm 19, to limit the pivotal movement of the arm 22 in one direction. Connected to the forward edges of the arms 19 and 22, is a coil spring 27 which normally swings the arm 22 upwardly to lie at an obtuse angle with respect to the arm 19.

Also rotatably mounted on the rear portion of the frame 10 is a transverse rock shaft 28, and mounted on each end of this shaft is a downwardly and forwardly extending arm 29, having a fork 30 formed on its free end. It will be noted that each of the arms 29 is so arranged, that when the shaft 28 is rocked, the fork 30 will engage with the arm 22 depressing the same until the head 25 engages with the arm 19, which brings the point 23 into contact with the ground. Then, upon the forward movement of the machine, the arms 19 and 22, which become in effect a single unit, will rock rearwardly and push upwardly on the plate 17, with result that the tooth shaft 19 will be rocked and the rake teeth 16 raised to discharge the load of hay collected by the teeth.

The shaft 28 is rocked by means of a hand lever 31 mounted on the shaft intermediate the ends thereof, and within convenient reach of the driver from the seat 32, also mounted on the frame 10.

Upon the release of the lever 31 the rake teeth gravitate into contact with the ground with the result that the plate 17 will exert a downward push on the arms 19 and 22.

As the rake teeth move upwardly from the load they rebound, or produce a jerk which lifts the arm 19 sufficiently high to permit the point of the arm 22 to be released from the ground when the spring 27 will swing the arm 22 upwardly. The parts will then be restored to normal position so that the rake can collect another load.

On the shaft 15 is mounted a lever 33, by means of which the rake may be dumped manually. This also may be used to release the arm 22 from the ground.

What is claimed is:

1. The combination with the frame and rake of a dumping rake, of a rearwardly and downwardly curved arm carried by one end of the rake and movable therewith, an arm pivotally mounted on and extending normally forward from said curved arm, a second arm pivotally connected adjacent one end to the outer end of the last-mentioned pivoted arm, a transverse head on the pivotal end of the second arm for limiting its movement with respect to the first pivoted arm, and an arm carried by the frame arranged to be swung into engagement with the second pivoted arm to engage the free end thereof in the ground whereby to produce the rearward movement of the arms and the lifting of the rake upon forward movement of the dumping rake.

2. The combination with the frame and the rock shaft of the rake of a dumping rake, of a second rock shaft carried by the frame, a radial arm carried by and movable with the rock shaft of the rake, an arm pivotally connected with said radial arm and extending downwardly therefrom, the lower end of pivoted arm being bifurcated, a second arm having its upper portion pivotally supported in the said bifurcation and having a T-head for engagement with the arms of the bifurcation, a spring connected to and extending between the pivotally connected arms for normally and yieldably holding the arms, and an arm carried by the said second rock shaft movable, upon rocking the shaft, into engagement with the second arm to swing said second arm into contact with the ground, whereby the forward movement of the frame of the dumping rake will move said arms rearwardly to cause the rocking of the rake shaft and the movement of the rake into dumping position.

In testimony whereof, I affix my signature, in the presence of two witnesses.

GEORGE E. EVEY.

Witnesses:
G. W. SAMPSON,
CARRIE J. CARY.